Jan. 6, 1953     H. W. BISHOP     2,624,056
TRIMMING MACHINE
Filed Jan. 18, 1949     5 Sheets-Sheet 1

*Inventor*
Harold W. Bishop
By his Attorney

Jan. 6, 1953         H. W. BISHOP         2,624,056
TRIMMING MACHINE
Filed Jan. 18, 1949         5 Sheets-Sheet 3
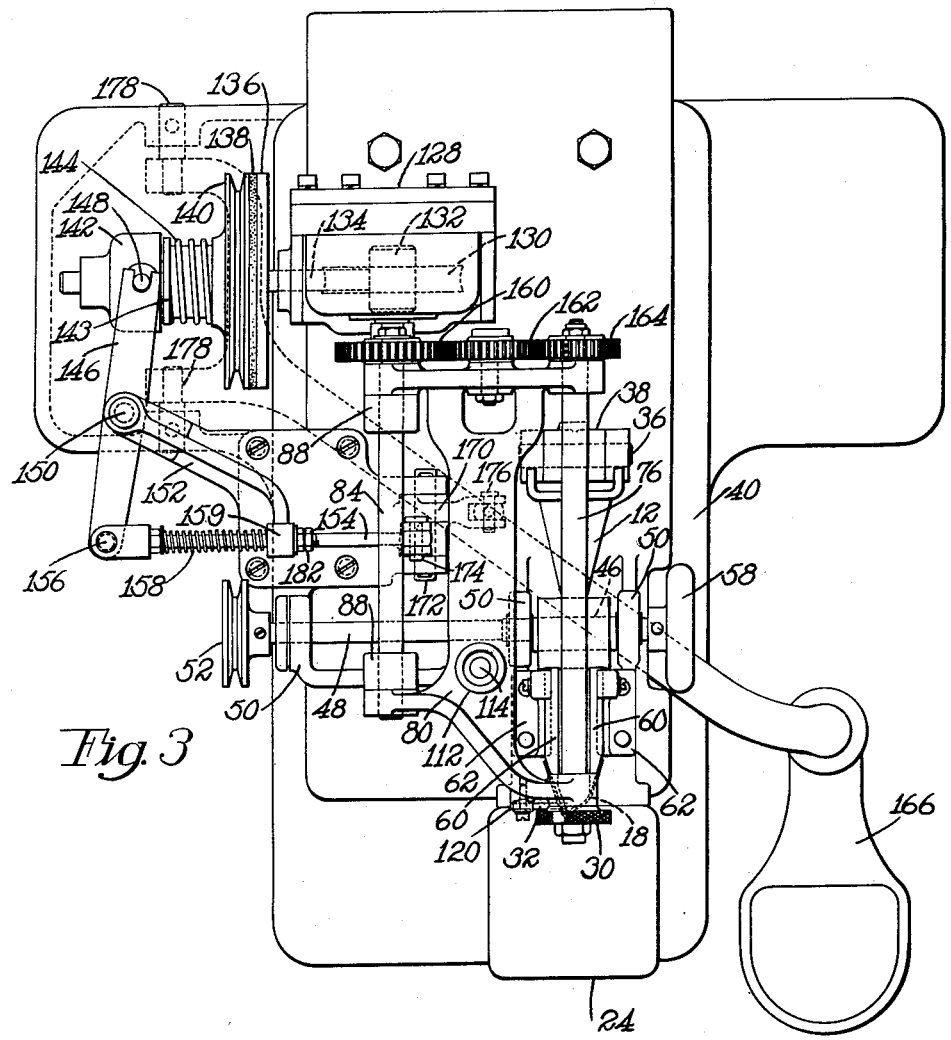
Fig. 3
Inventor
Harold W. Bishop
By his Attorney

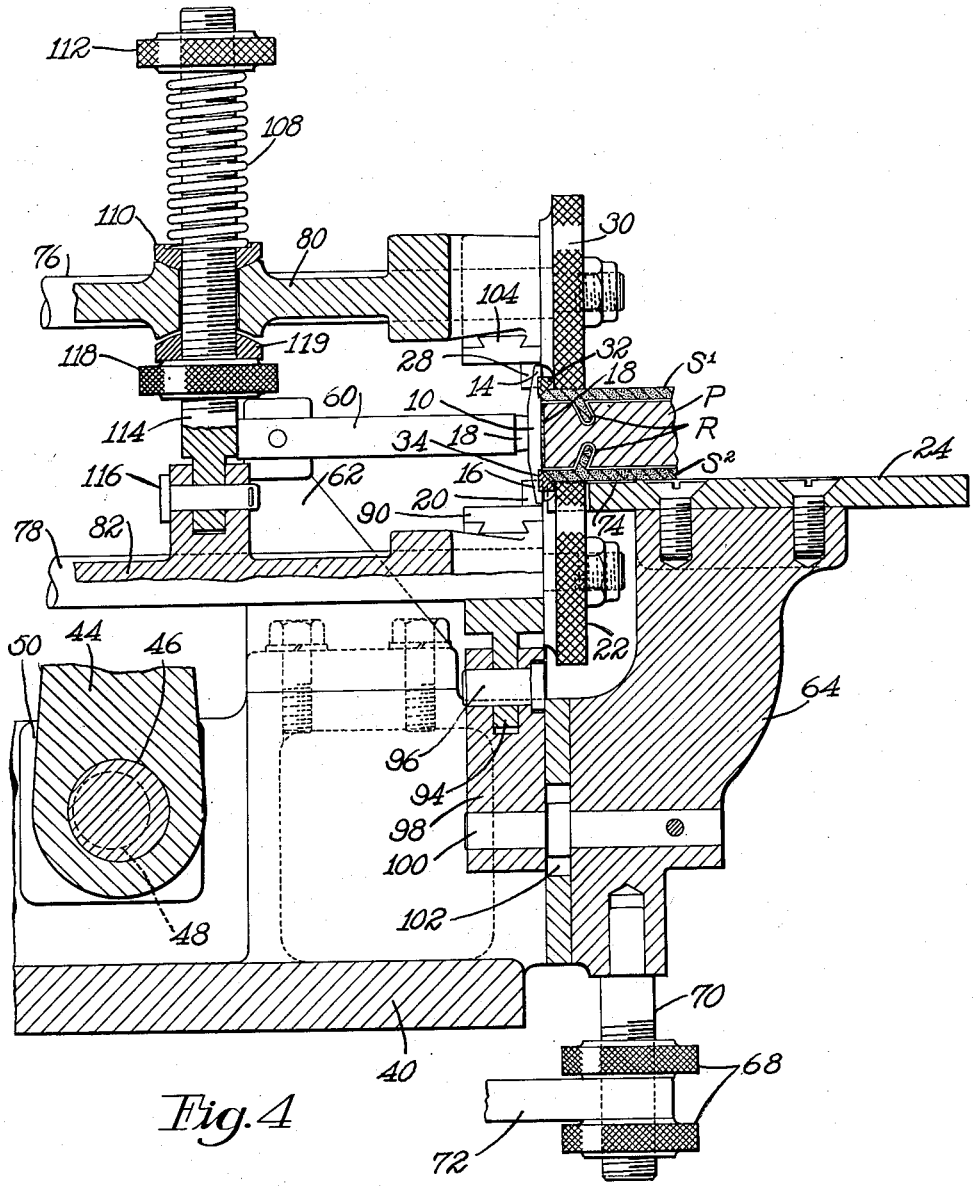

Jan. 6, 1953   H. W. BISHOP   2,624,056
TRIMMING MACHINE
Filed Jan. 18, 1949   5 Sheets-Sheet 5
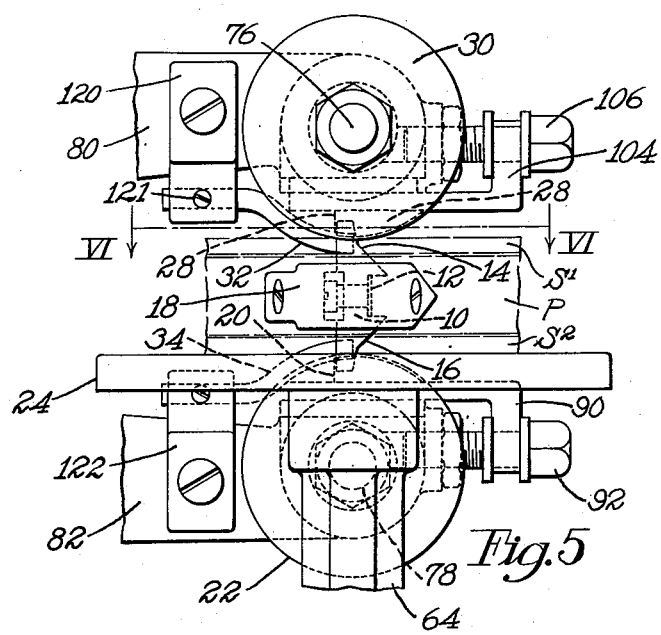
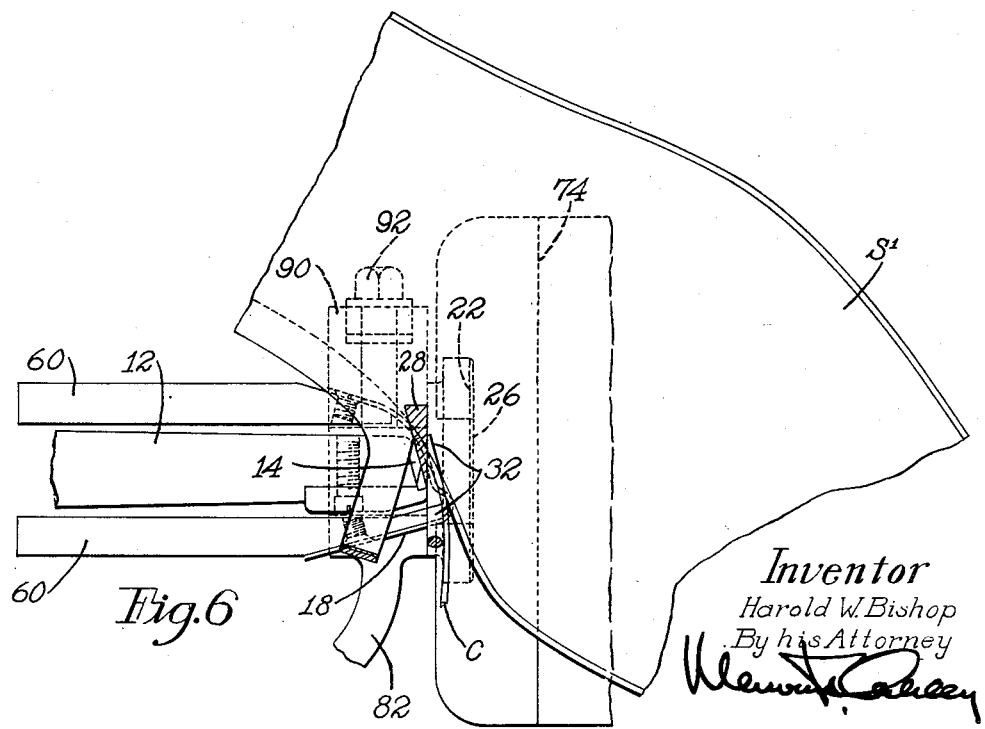
Inventor
Harold W. Bishop
By his Attorney

UNITED STATES PATENT OFFICE 2,624,056

TRIMMING MACHINE

Harold W. Bishop, Essex, Mass., assignor to United Shoe Machinery Corporation, Flemington, N. J., a corporation of New Jersey Application January 18, 1949, Serial No. 71,481

13 Claims. (Cl. 12—17)

This invention relates to trimming machines of a type adapted for simultaneously trimming right and left work pieces of a pair in conformity to a pattern. By way of example, the invention is disclosed herein with reference to the trimming of insoles for shoes; but it is to be understood that the invention may have application to the trimming of other kinds of soles, shoe parts or work pieces, either in pairs or singly.

The invention is illustrated herein as embodied in a machine of the type disclosed in United States Letters Patent No. 2,472,228, granted on June 7, 1949 upon an application of Hans C. Paulsen. The Paulsen machine is characterized by a vibrating knife having opposed blades each of which is arranged to trim, in conformity to a pattern, one of two insoles applied to the opposite sides of the pattern. The pattern with the soles thereon is presented to the knife so that the stroke of the latter extends transversely of the edge of the pattern. The cutting stroke of each blade is directed toward the outer side of the sole upon which it acts and each sole is supported at its outer side adjacent to the knife against the thrust thereof. The stroke of the knife in this machine is of predetermined amplitude, but is adjustable lengthwise thereof to equalize the cutting action of the knife blades upon the soles for the sake of smoothness in both the trimming cuts and the operation of the machine.

It is a general object of the invention to provide an improved machine of this type, giving consideration to the desirability of maintaining the desired relation between the knife and the work regardless of the thickness of the work, and of providing a simple and durable construction by which the adjustment of the machine in this respect can be made as easily as possible.

In view of the foregoing, the illustrative machine includes with a vibrating knife, means for supporting the soles and pattern which means, in accordance with one feature of the invention, is mounted for adjustment relatively to the knife to center the soles with respect to the stroke of the knife, and hence to equalize the cutting action of its blades upon the soles.

As in the Paulsen machine mentioned above, the present one is provided with work supporting means comprising upper and lower supports each of which includes a feeding member and a block. The lower support comprises in addition a table disposed substantially at the common level of the feeding member and block.

In the present machine, and in accordance with another feature of the invention, means is provided for adjusting both supports together lengthwise of the stroke of the knife. Invention is also to be recognized in certain features of the mounting and arrangement of the blocks and also of the supports which permit their above-mentioned adjustment with respect to the knife to be made without interfering with the drive for the feeding members, and without disturbing the adjusted relation between the supports themselves.

It is desirable to make the interior of a shoe as free as possible from ridges or edges which might detract from the comfort of the shoe to the wearer. With this purpose in view, the sharpness of the intersection of the upper surface of an insole with the edge is commonly relieved by chamfering it. In view of the foregoing, the illustrated machine is provided with means for chamfering the soles while they are being trimmed. This means comprises, in accordance with another feature of the invention, a pair of chamfering knifes each of which is associated with one of the supports and is arranged to operate upon one of the soles immediately behind the point of operation of the trimming knife.

This relation of the chamfering knives to the trimming knife and supports insures uniformity in the chamfering cuts, since their width is determined by the same guiding action which controls the trimming cuts, and their depth is held constant by the gaging effect of the work supports.

The above and other features of the invention will now be described in detail in connection with the accompanying drawings, and will be defined in the claims.

In the drawings,

Fig. 3 is a plan view;

Fig. 4 is an enlarged sectional elevation of the forward portion of the machine illustrating the relation of the operating members and the work during a trimming operation;

Fig. 5 is an enlarged front elevation of the operating members; and

Fig. 6 is a sectional plan view, the section being taken along the line VI—VI in Fig. 5.

Figure 1:
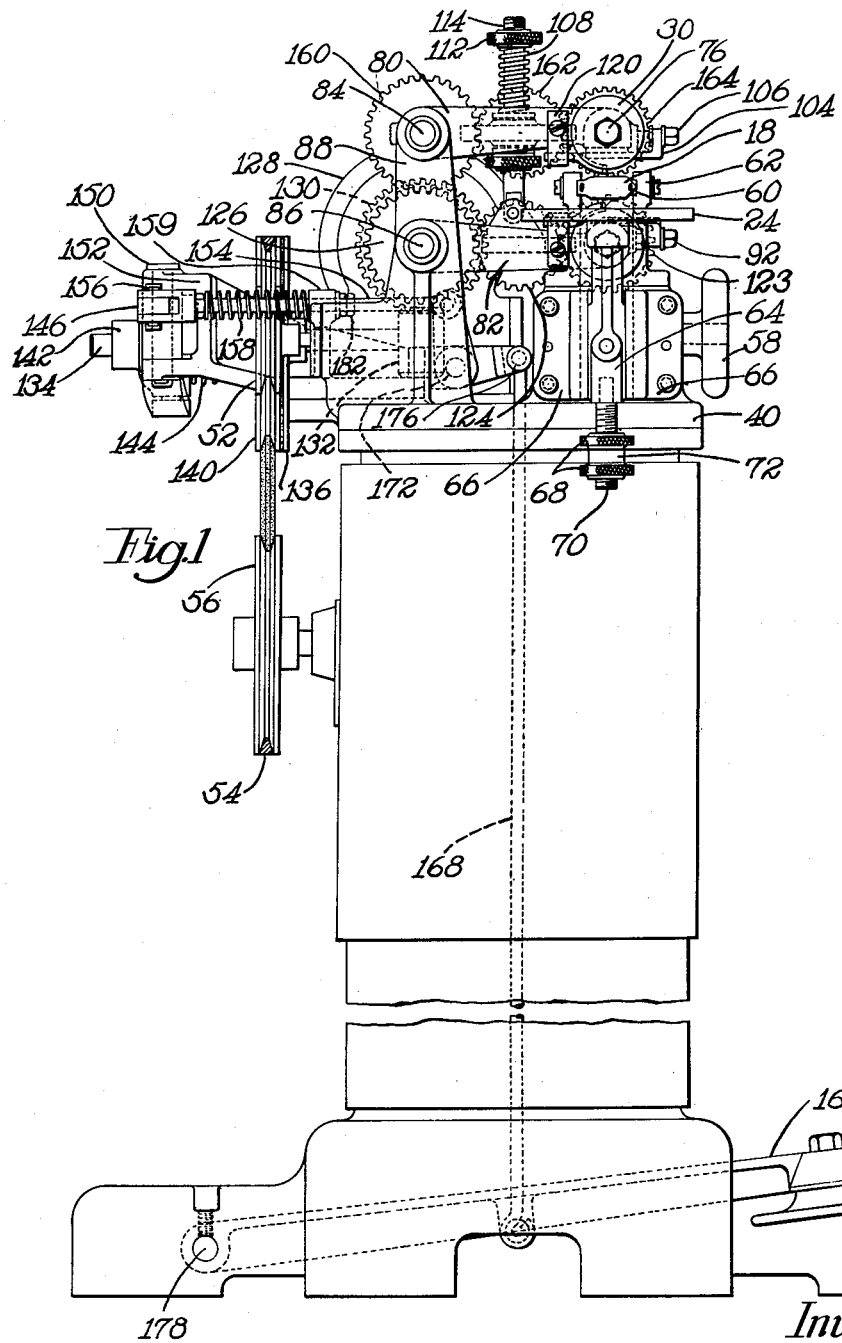
Fig. 1 is a front elevation of an illustrative machine embodying the invention.

The work upon which the illustrated machine is intended to operate consists ordinarily of a pair of insoles $S^1$, $S^2$, (Fig. 4), one being disposed at each side of a pattern P, the periphery of which is shaped in accordance with the desired outline of the insoles. The insoles are temporarily attached to the pattern by having their ribs inserted in recesses R formed in the pattern as disclosed in United States Letters Patent No. 2,538,776, granted January 23, 1951, upon an application filed in the name of Stanley M. Griswold.

The operation which the machine is to perform is that of simultaneously trimming the edges of the insoles $S^1$ and $S^2$ to the shape of the pattern, and also chamfering the outer edges of the soles. Although the invention is disclosed herein with reference to the trimming of two insoles simutlaneously, it is to be understood that it is also applicable to the trimming of only one sole at a time, which sole may be also of any type and fixed to an ordinary pattern by any common means, such as by tacks for example.

The soles are trimmed by a knife 10 (Figs. 4 and 5) which is mounted upon a vertically vibrating carrier 12, and has upper and lower blades 14, 16 which are arranged to operate upon the soles $S^1$ and $S^2$ respectively. Closely adjacent to the outer side of the knife is a guide 18 which is so shaped (Fig. 6) as to provide two shoulders which are adapted to be engaged by the edge of the pattern P at spaced points. This guide is so thin and so close to the knife that the line of cut of the knife is only $\frac{1}{32}$ of an inch or less off the edge of the pattern. The knife 10, its mounting upon the carrier 12, and the guide 18 are constructed like the same features of the machine disclosed in the Paulsen patent referred to above.

Work supporting means is provided for supporting each of the soles at its outer side against the cutting action of the knife 10, the cutting stroke of each blade being directed outwardly across the edge of the sole upon which it operates. The lower sole $S^2$ is supported along a narrow width of its margin, inwardly from the line of cut, by a shear block 20 (Fig. 4) which is mounted substantially in contact with the outer side of the knife blade 16. The insole $S^2$ is also supported, inwardly of the area engaged by the block 20, by a feeding member in the form of a roll 22, the uppermost part of its periphery being at the level of the work engaging surface of the block 20. Further support for the sole $S^2$ is provided by a table 24 having a recess 26 (Fig. 6) through which the roll 22 extends. As will be explained later, the block 20, roll 22, and table 24 are adjustable together along the stroke of the knife 10 and are always maintained at the same level.

The upper insole $S^1$ is supported against the cutting action of the knife blade 14, inwardly from the line of cut, by a shear block 28 (Fig. 4) similar to the above-mentioned block 20. This sole is further supported, inwardly thereof from the area engaged by the block 28, by a feeding member 30, a roll like and directly above the roll 22. The rolls 22 and 30 are so mounted that, when rotated, they exert a feeding action upon the work which both imparts a feeding movement to the work and holds the pattern P against the spaced shoulders on the guide 18, whereby the work is swung in accordance with the changes in the contour of the pattern as the trimming cut is transferred completely around the work. The feeding action also of this machine is the same as is described in the above-mentioned Paulsen patent to which reference may be made for a more complete description of this feature of the present machine.

Immediately behind each of the knife blades 14, 16 (along the line of cut) there are mounted chamfering knives 32, 34 (Fig. 5) respectively, which chamfer the outer corners of the soles just behind the points where their edges are trimmed by the knife by removing a thin chip C (Fig. 6) of triangular cross-section from each sole.

Having outlined the principal operating members of the machine, their arrangement and functions, the details of these and other features of the machine will now be described.

Figure 2:
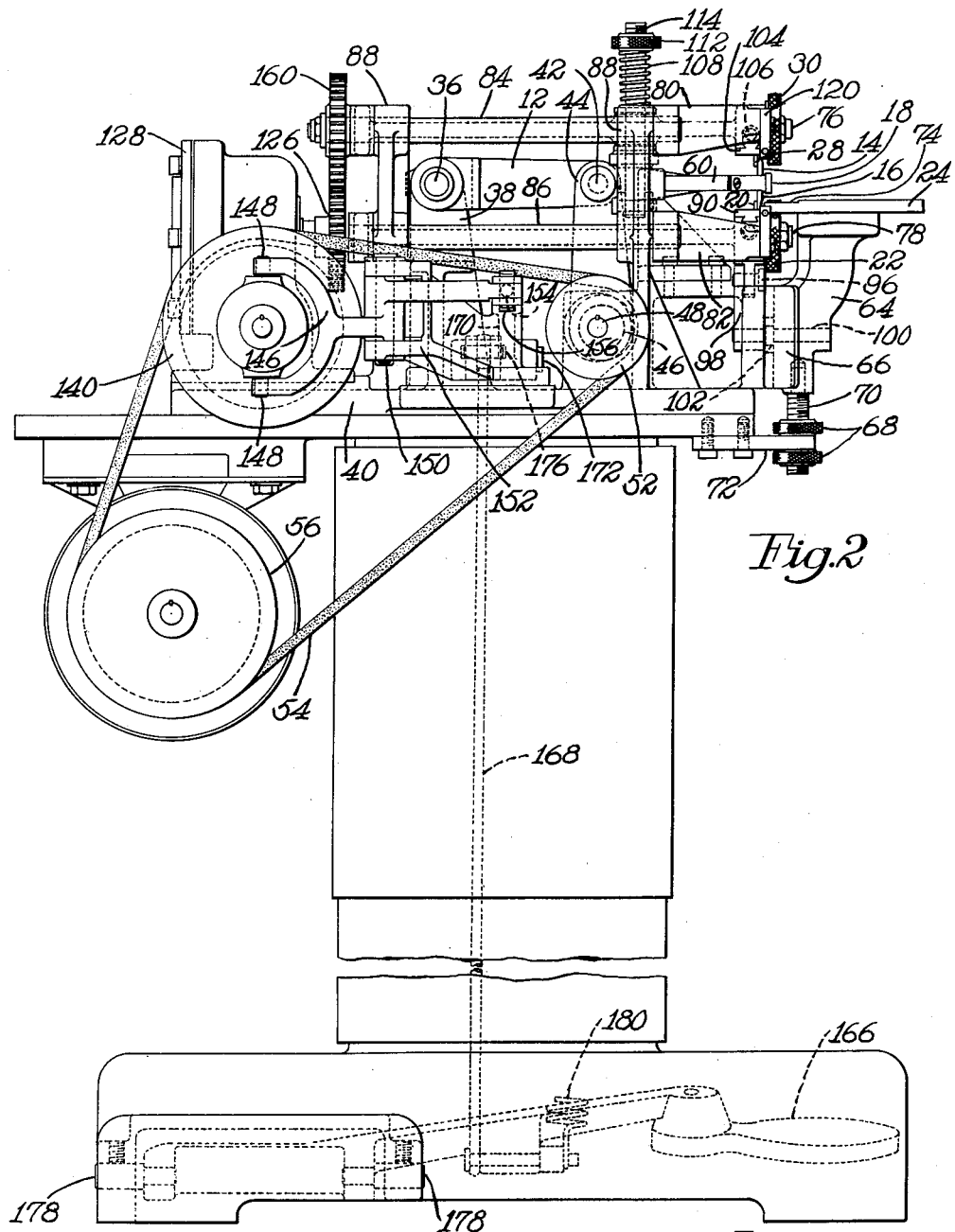
Fig. 2 is an elevation of the machine as viewed from the left.

The knife-carrier 12 is mounted to swing at its rear end upon a pin 36 (Fig. 2) which is fixed in the upper end of a post 38 extending upwardly from the frame 40 of the machine. Near the mid-portion of the carrier it is pivotally connected by a pin 42 to a connecting rod 44, the lower end of which encircles an eccentric 46 upon a shaft 48 (Fig. 3) which is mounted to rotate freely in bearings 50 fixed to the frame 40. This shaft is driven by a pulley 52 over which runs a belt 54 which is driven by a motor-pulley 56. A hand wheel 58 is provided on the right-hand end of the shaft 48 to enable the operator to operate the knife manually when the adjustment of the machine is to be tested.

The guide 18 is fixed to the forward ends of two struts 60, 60 (Figs. 3 and 6), one being fixed at each side of the carrier 12 upon a bracket 62 which is fixed to the frame 40. The guide is supported so close to the cutting edges of the knife, as illustrated in Fig. 6, that there is negligible clearance between them. It is thus possible for the knife to trim the soles to within $\frac{1}{32}$ of an inch or less of the edge of the pattern P.

The table 24 is fixed to the upper end of a bracket 64 which is mounted for adjustment vertically in a slideway formed at the forward end of the frame 40 by a pair of plates 66, 66 which are fixed to the frame and overlap the sides of the bracket. Heightwise adjustment of the table is effected by turning a pair of thumb-nuts 68, 68 which are threaded on a stud 70 extending downwardly from the bracket. An arm 72 fixed to the frame, and having a hole through which the stud 70 passes freely, provides an abutment cooperating with the thumb-nuts 68. The above-mentioned recess 26 in the table 24 permits the lower feed roll 22 to extend upwardly through the table to the general level thereof. It will be noted from Figs. 4 and 6 that the upper surface of the table has a shallow recess 74 along its rear margin which permits the feed roll 22 to receive most of the downward pressure of the work and minimizes the frictional resistance of the table to the swinging of the work.

The feed rolls 30 and 22 are fixed upon the forward ends of shafts 76, 78 respectively, the shafts being rotatably mounted, one over the other, in swing frames 80, 82 respectively. The swing frames 80, 82 are rotatably mounted by shafts 84, 86 respectively upon a pair of posts 88, 88 which extend upwardly from the frame 40, the shafts being parallel and spaced heightwise by a distance approximately equal to the normal spacing between the axes of the feed rolls 30, 22.

The shear block 20 (Figs. 4 and 5) is a prism-shaped member integral with and arranged to project upwardly from a dovetail slide 90 which is mounted for adjustment transversely of the shaft 78 at the forward end of the swing frame 82. It will now be evident that the block 20, if adjusted laterally, is moved in a direction making a small angle with the edge of the block which is adjacent to the knife; and by thus moving the slide 90, a very close adjustment of the block toward and away from the knife can be obtained. This adjustment is made by turning a screw 92 threaded into the swing frame 82, and having a recess next to its head which receives the end of the slide 90.

The shear block 20 and feed roll 22 are so arranged that the upper surface of the block and the uppermost part of the feed roll are at the same level, and by means of the connections next to be described these supporting members are maintained at the same level as that of the table 24 at all times. Extending downwardly from the forward end of the swing frame 82 is a projection 94 to which is pivoted, by a pin 96 a link 98, the latter at its lower end being mounted to swing upon a stud 100 which is fixed to the bracket 64 and extends through a slot 102 in the frame, allowing free movement of the stud with respect to the frame. It will now be evident that all elements of the lower supporting means (the block 20, feed roll 22 and table 24) will always be supported at the same level and will always be moved together when any adjustment is made using the thumb-nuts 68.

The upper shear block 28 (Figs. 4, 5 and 6) is similar to the lower shear block 20, and is mounted upon a slide 104 which is mounted for lateral adjustment in the swing frame 80 directly above the slide 90. An adjusting screw 106, similar to the above-mentioned screw 92, is threaded into the swing frame 80 and can be used to bring the block 28 up to the edge of the knife-blade 14 in the manner described above with reference to the adjustment of the block 20. The sole engaging surface of the block 28 is disposed at the level of the lowermost portion of the feed roll 30 so that the upper sole $S^1$ is supported by these members inwardly from the line of cut for a considerable distance.

The upper swing frame 80 is urged downwardly to cause the feed roll 30 and block 28 to press against the upper sole $S^1$ by a spring 108 (Fig. 4), the lower end of which engages a washer 110 seated upon the swing frame. The upper end of the spring abuts a thumb-nut 112 which is threaded on a rod 114 arranged to pass freely through a hole in the swing frame 80. This rod is pivotally connected by a pin 116 to the lower swing frame 82. Any desired pressure of the upper supporting means against the work can be obtained by adjusting the thumb screw 112 to set up more or less compression in spring 108. The normal spacing between the upper and lower supporting means, when there is no work in the machine, is slightly less than the aggregate thickness of the pattern P and soles $S^1$, $S^2$. This spacing can be varied in accordance with the thickness of the work by another thumb-nut 118 which also is threaded on the rod 114, and is arranged to engage a washer 119 which seats against the lower side of the swing frame 80.

Immediately upon being trimmed, each of the soles $S^1$ and $S^2$ is chamfered by having removed therefrom the thin strip C (Fig. 6) of triangular cross-section. This operation is performed by the chamfering knives 32, 34 associated with the knife-blades 14, 16, respectively. These chamfering knives are bent in one plane as illustrated in Fig. 5, and in another plane as indicated by the form of the knife 32 in Fig. 6, so that their cutting edges can be brought into close proximity to the knife 10, and extend obliquely from it inwardly of the edges of the soles. The knife 32 is mounted to turn and slide, for purposes of adjusting it relatively to the knife-blade 14, in a bracket 120 (Fig. 5) which is fixed to the swing frame 80. The knife 32 is held in adjusted position by a setscrew 121 which is threaded into the bracket. The knife 34 is similarly mounted upon a bracket 122 which is fixed to the swing frame 82. Because of the curved form of the knives 32 and 34, their positions toward and away from the knife can be changed by turning them within the brackets 120 and 122, respectively; and their positions relatively to the edges of the knife 10 along the line of cut can be varied by sliding them in either direction in the brackets.

Although the work may be fed by hand past the knife in engagement with the guide 18, the feed rolls 22, 30 are power driven in the illustrative machine causing the work to be fed and held against the guide 18 by a cross-feeding action, so that the operator is not required to feed or even guide the work throughout a complete transfer of a trimming cut around the soles. The drive for the feed roll 22 comprises a gear 123 (Fig. 1) which is fixed to the rear end of the shaft 78, an idler gear 124 mounted to rotate on the swing frame 82 in mesh with the gear 123, and another gear 126 which meshes with the idler gear and is mounted on the output shaft of a reduction gear unit 128. This unit has a worm gear 130 (Fig. 3) meshing with a worm 132 which is fixed to the input shaft 134 of the unit. This shaft has fixed thereto a flange 136 which is faced with a friction disk 138 adapted to be engaged by a pulley 140 over which the belt 54 runs, the pulley being mounted to rotate freely upon the shaft 134. A collar 142, within which the shaft 134 freely rotates, is mounted to slide axially of the shaft, and at its right-hand side is engaged by a flange 143 upon which the end of a compression spring 144 seats. This spring encircles the hub of the pulley 140 and urges it into engagement with the friction disk 138. The collar 142 is controlled by a forked lever 146, the rear ends of which are slotted to receive trunnions 148 carried by the collar 142. The lever 146 is pivoted at 150 to a bracket 152 which is fixed to the frame 40. The lever is operated by a rod 154 which is pivoted at 156 to the forward end of the lever. A compression spring 158, surrounding the rod 154 and arranged to abut a shoulder 159 on the bracket 152, is somewhat stronger than the spring 144, and, acting through the rod 154, lever 146, collar 142, and spring 144, normally holds the pulley 140 against the friction disk 138 with sufficient force to drive the feed rolls 22, 30.

The feed roll 30 is driven at the same speed as that of the feed roll 22, but in the opposite direction, by a gear train comprising a gear 160 (Figs. 1 and 3) which is mounted to rotate freely on the shaft 84 and in mesh with the gear 126, an idler gear 162 mounted to rotate on the swing frame 80, and another gear 164 which is fixed to the shaft 76 carrying the feed roll 30.

Provision is made in the machine for interrupting the feeding movement of the rolls 22, 30 when work is presented to or removed from the machine, or for slowing down their feeding movement when the trimming cut is being made around sharply curved portions of the work, as at the toe and heel ends of a sole or at the junction of the shank and the forepart. Such control of the machine is obtained by depressing a treadle 166 which is connected to the rod 154 by a treadle rod 168, and a bell crank 170. This bell crank, which is pivoted at 172 to the bracket 152, has a vertical arm to which the rod 154 is pivoted at 174, and also a horizontal arm to which the treadle rod 168 is pivoted at 176. The treadle 166 is mounted to swing on studs 178 which are mounted in alinement with each other in the base of the frame 40. A spring 180 (Fig. 2) extending upwardly from the treadle to the frame 40, yieldingly holds the collar 142 and the connections between it and the treadle in their normal operative positions as determined by a pair of lock-nuts 182, 182 which are threaded on the rod 154 and are adapted to engage the shoulder 159.

The use and operation of the machine will now be briefly summarized. The work, consisting of soles such as the insoles $S^1$, $S^2$ assembled upon the pattern P, is placed upon the table 24 and is slid into the bite of the feed rolls 30, 22 which have been stopped by depressing the treadle 166, the knife 10 being continuously vibrated. The treadle 166 is now gradually released, permitting the drive for the feed rolls to function, and causing the rolls to start the feeding movement of the work. The knife 10 first makes cuts inwardly from the edges of the soles to the desired lines of cut slightly off the edge of the pattern, as the pattern moves inwardly into engagement with both of the shoulders on the guide 18 under the cross-feeding effect of the feed rolls. Thereafter the pattern is maintained in engagement at spaced points along its periphery with the guide 18, and the knife 10 makes its trimming cuts in both soles parallel to the contour of the pattern, and spaced $\frac{1}{32}$ of an inch or less off its edge.

The knife-blade 16 cuts on the downward stroke of the knife and the knife blade 14 cuts on the upward stroke, the cutting action upon each sole thus being directed toward its side which is remote from the pattern. The soles are supported at these sides against the cutting action of the knife by the supporting means which, for the lower sole $S^2$ comprises the shear block 20 and the feed roll 22 principally. The table 24 contributes to the support for the sole in this respect, but its principal purposes are to provide a platform for sustaining the weight of the soles and pattern and also to keep them level as they swing from side to side during a trimming operation. Similarly, the upper sole $S^1$ is supported against the cutting action of the knife-blade 14 by the shear block 28 and the feed roll 30. Immediately behind the points of operation of the knife 10 upon the soles the chamfering knives 32 and 34 remove the small chamfering chip C from the upper and lower edges of the soles. If, upon rounding any sharply curved portion of the pattern, it is desired to slow the speed of the feeding movement, the operator depresses the treadle 166 and diminishes the driving friction between the pulley 140 and the friction disk 138, whereby the speed of rotation of the rolls 30 and 22 is slowed down.

Unevenness in the cutting action of the knife-blades 14, 16 can be corrected by adjusting the thumb-nuts 68, by which the position of the entire lower supporting means can be adjusted to center the soles with respect to the stroke of the knife. That is, when the machine is in proper adjustment the common level of the table 24, feed roll 22, and block 20, is such that the middle of the pattern P is opposite to the mid point of the stroke of the knife 10. Since the upper and lower swing frames 80 and 82 are connected by the rod 114, the upper supporting means is adjusted simultaneously with the lower supporting means, without changing their spacing or affecting the pressure with which work is gripped between them.

By adjusting the thumb-nut 112, the operator can easily obtain the least amount of friction between the work and the feed rolls which is necessary to drive the work without marring it. The adjustment of the thumb-nut 113, which limits the downward movement of the swing frame 80, is made so that there is a small amount of clearance between the washer 119 and the upper swing frame 80 during the trimming operation. Accordingly, the swing frame 80 is displaced upwardly by only a small amount when the work first passes into the bite of the feed rolls.

Having thus described my invention, what I claim as new and desire to secure by Letters Patent of the United States is:

1. In a machine for trimming soles applied to the opposite sides of a pattern in conformity thereto, a vibrating knife having opposed blades extending lengthwise of its stroke, a guide arranged to position the soles and pattern relatively to said knife by engagement with the edge of the pattern, and means for supporting the soles and pattern so that the stroke of said knife extends transversely of the edge of the pattern through the soles, said means being mounted for movement lengthwise of the stroke of said knife to position the soles centrally with respect to the paths of said blades.

2. In a machine for trimming soles applied to the opposite sides of a pattern in conformity thereto, a guide arranged to engage the edge of the pattern, a knife mounted to vibrate with a predetermined stroke crosswise of the edge of the pattern, opposed members for supporting the soles at their outer sides inwardly from the points of operation of the knife, said members being mounted for movement together lengthwise of the stroke of the knife to center the soles with respect to the stroke of the knife, and means for adjusting said members.

3. In a machine for trimming soles applied to the opposite sides of a pattern in conformity thereto, a vibrating knife having opposed blades extending lengthwise of its stroke, means for guiding the soles and pattern relatively to the knife by engagement with the edge of the pattern, means for supporting the soles and pattern so that the stroke of said knife extends transversely of the edge of the pattern through the soles, said means comprising blocks arranged to engage the outer sides of the soles adjacent to the knife, said blocks being mounted for movement lengthwise of the stroke of said knife to center the soles with respect to the paths of said blades, and means for feeding the soles and pattern past said knife.

4. In a machine for trimming soles applied to a pattern in conformity to the pattern, a knife mounted to vibrate with a predetermined stroke crosswise of the edge of the pattern, opposed supports arranged to position the soles and pattern with respect to the stroke of the knife, said supports being arranged to cooperate with said knife to trim the soles, means for adjusting said supports lengthwise of the stroke of the knife to center the soles with respect to the paths of the knife, and means for adjusting said supports into juxtaposition to said knife.

5. In a machine for trimming a sole applied to a pattern in conformity thereto, a vibrating knife having a cutting blade extending lengthwise of its stroke, means for supporting the sole and pattern adjacent to said blade so that its stroke extends through the sole transversely of the edge of the pattern, said means being mounted for adjustment lengthwise of said blade for centering the sole with respect to the path of said blade, means for imparting a feeding movement to the sole and pattern, and a guide arranged to engage the edge of the pattern whereby the point of operation of the knife is maintained at a uniform distance from the edge of the pattern.

6. In a machine for trimming soles applied to a pattern in conformity thereto, a guide arranged to engage the edge of the pattern, a knife having opposed blades arranged to project through the soles and mounted to vibrate with a predetermined stroke crosswise of the edge of the pattern, spaced supports arranged to engage the outer sides of the soles inwardly thereof from the points of operation of the knife, and feeding members arranged to engage the soles inside the line of cut of the knife, said supports and feeding members being mounted for adjustment together lengthwise of the stroke of the knife to center the soles with respect to the stroke of the knife.

7. In a machine for trimming soles applied to the opposite sides of a pattern in conformity thereto, a vibrating knife having opposed blades extending lengthwise of its stroke, means for guiding the soles and pattern relatively to said knife arranged to engage the edge of the pattern, opposed blocks arranged to support the margins of the soles inwardly thereof from the lines of cut against the cutting action of said blades, said blocks being mounted for movement together to center the soles with respect to the path of said blades, and a table disposed at the level of one of said blocks and mounted for adjustment therewith.

8. In a machine for trimming a sole applied to a pattern in conformity thereto, a knife mounted to vibrate with a predetermined stroke crosswise of the edge of the pattern, a guide arranged to engage the edge of the pattern, opposed supports arranged to position the sole and pattern with respect to the knife and guide respectively, means for adjusting said supports together to center the sole with respect to the path of the knife, a feeding member associated with each support, and a table mounted for adjustment with one of said supports for supporting the sole at the level of the last-mentioned support.

9. In a machine for trimming soles applied to the opposite sides of a pattern in conformity thereto, a vibrating knife having opposed blades extending lengthwise of its stroke, a pair of frames each of which is mounted for movement lengthwise of the stroke of said knife, and a block mounted upon each frame and arranged to support the soles and pattern so that the stroke of the knife extends transversely of the edge of the pattern, each block having a sole engaging surface terminating in an edge contiguous to said knife, said blocks being mounted for adjustment on said frames at an angle to said edges to bring said edges into juxtaposition to said knife.

10. In a machine for trimming a sole applied to a pattern in conformity thereto, a knife mounted to vibrate with a predetermined stroke crosswise of the edge of the pattern, a pair of frames each being mounted to move lengthwise of the stroke of said knife, each frame carrying a support and a feed member adapted to engage the exposed sides of the sole and pattern, connections between said frames for urging them toward each other and comprising a stop for determining their proximal relation, and means for adjusting said frames together whereby the sole is centered with respect to the stroke of said knife.

11. In a machine for trimming a sole applied to a pattern in conformity thereto, a knife mounted to vibrate with a predetermined stroke crosswise of the edge of the pattern, a pair of frames each being mounted to swing lengthwise of the stroke of the knife, each frame carrying a support and a feed member adapted to engage the exposed sides of the sole and pattern, means for urging said frames toward each other to cause the sole and pattern to be gripped between said supports and feed members, a table arranged to support the sole flush with one of said supports and mounted for adjustment therewith to vary the position of the sole with respect to the path of said knife, and means for adjusting said table and the support associated therewith.

12. In a machine for trimming a sole applied to a pattern in conformity to the pattern, a trimming knife mounted to vibrate crosswise of the edge of the pattern, a support arranged to position the sole and pattern contiguous to the line of cut of the knife lengthwise of the stroke of the knife, a guide arranged to engage the edge of the pattern whereby the point of operation of the knife is maintained at a uniform distance from the edge of the pattern, and a chamfering knife mounted and arranged to chamfer the trimmed edge of the sole immediately behind the point of operation of said trimming knife.

13. In a machine for trimming soles applied to the opposite sides of a pattern in conformity to the pattern, a trimming knife mounted to vibrate with a predetermined stroke crosswise of the edge of the pattern and having opposed blades each of which is arranged to trim one of the soles, opposed supports arranged to engage the outer sides of the soles adjacent to the knife, said supports being mounted for adjustment lengthwise of the stroke of said knife to center the soles with respect to the path of said blades, and a chamfering knife associated with each of said supports for chamfering the outer trimmed edges of the soles.

HAROLD W. BISHOP.

REFERENCES CITED

The following references are of record in the file of this patent:

UNITED STATES PATENTS

| Number | Name | Date |
|---|---|---|
| 237,671 | Beaudry | Feb. 15, 1881 |
| 286,957 | Pratt | Oct. 16, 1883 |
| 375,960 | Stanbon | Jan. 3, 1888 |
| 2,472,228 | Paulsen | June 7, 1949 |